(12) United States Patent
Meade et al.

(10) Patent No.: US 8,718,466 B2
(45) Date of Patent: May 6, 2014

(54) METHOD AND APPARATUS PROVIDING WAVE DIVISION MULTIPLEXING OPTICAL COMMUNICATION SYSTEM WITH ACTIVE CARRIER HOPPING

(75) Inventors: Roy Meade, Boise, ID (US); Gurtej Sandhu, Boise, ID (US)

(73) Assignee: Micron Technology Inc., Boise, ID (US)

( * ) Notice: Subject to any disclaimer, the term of this patent is extended or adjusted under 35 U.S.C. 154(b) by 93 days.

(21) Appl. No.: 13/547,139

(22) Filed: Jul. 12, 2012

(65) Prior Publication Data
US 2014/0016931 A1    Jan. 16, 2014

(51) Int. Cl.
*H04J 14/02*    (2006.01)
*H04B 10/032*   (2013.01)

(52) U.S. Cl.
USPC .................................. 398/7; 398/91; 398/183

(58) Field of Classification Search
None
See application file for complete search history.

(56) References Cited

U.S. PATENT DOCUMENTS

| | | | |
|---|---|---|---|
| 5,760,937 | A | 6/1998 | Ishikawa et al. |
| 6,888,681 | B2 | 5/2005 | Nakama |
| 7,800,282 | B2 | 9/2010 | Ayazi et al. |
| 2002/0081055 | A1 | 6/2002 | Painter et al. |
| 2002/0176132 | A1* | 11/2002 | Sarraf ............................ 359/124 |
| 2003/0012250 | A1 | 1/2003 | Shirasaki |
| 2003/0025966 | A1 | 2/2003 | Halgren et al. |
| 2003/0026529 | A1 | 2/2003 | Durkin et al. |
| 2006/0177221 | A1* | 8/2006 | Furst ............................... 398/38 |
| 2010/0329685 | A1 | 12/2010 | Zheng et al. |
| 2011/0280579 | A1 | 11/2011 | McLaren et al. |

FOREIGN PATENT DOCUMENTS

| | | |
|---|---|---|
| EP | 1 793 513 A2 | 6/2007 |
| JP | 55010250 A | 1/1980 |
| KR | 20040057477 A | 7/2004 |

OTHER PUBLICATIONS

A. Biberman et al., "Broadband Silicon Photonic Electrooptic Switch for Photonic Interconnection Networks," IEEE Photonics Technology Letters, vol. 23, No. 8, pp. 504-506, Apr. 15, 2011.
R. Amatya et al., "Efficient Thermal Tuning for Second-Order Silicon Nitride Microring Resonators," Research Laboratory of Electronics (RLE), Massachusetts Institute of Technology, IEEE, pp. 149-150, 2007.
B. T. Smith et al., Integrated Silicon Photonic Circuit: Monolithic 8-Channel Modulator, Tap, Vertical Coupler, and Flip-Chip Mounted Photodetector Array. Kotura, Inc., Monterey Park, CA, Proc. SPIE Silicon Photonics, Mar. 2006.
Network Tap—Wikipedia, the Free Encyclopedia, http://en.wikipedia.org/wiki/Network_tap, Apr. 25, 2012.
L. Chen et al., "Integrated GHz Silicon Photonic Interconnect with Micrometer-Scale Modulators and Detectors." Optics Express, vol. 17, No. 17, pp. 15248-15256, Aug. 17, 2009.
Eye Pattern—Wikipedia, the Free Encyclopedia, http://en.wikipedia.org/wiki/Eye_pattern, Apr. 24, 2012.

* cited by examiner

*Primary Examiner* — Leslie Pascal
(74) *Attorney, Agent, or Firm* — Dickstein Shapiro LLP (57) ABSTRACT

A wave division multiplexing (WDM) system is disclosed which accommodates shifts in the resonant frequency of optical modulators by using at least two carriers per optical communications channel and at least two resonant modulator circuits respectively associated with the carriers within each optical modulator. A first resonant modulator circuit resonates with a first carrier and a second resonates with a second carrier when there is a shift in resonance frequency of the at least two resonant optical modulator circuits. A switch circuit controls which carrier is being modulated by its respective resonant modulator circuit.

32 Claims, 6 Drawing Sheets

METHOD AND APPARATUS PROVIDING WAVE DIVISION MULTIPLEXING OPTICAL COMMUNICATION SYSTEM WITH ACTIVE CARRIER HOPPING

FIELD OF THE INVENTION

Embodiments of the present invention relate to wave division multiplexing optical communication systems which compensate for operational changes in photonic devices due to temperature changes.

BACKGROUND OF THE INVENTION

Silicon-based integrated circuits have long been used as a platform for microelectronic applications. More recently, as speed, bandwidth and signal processing requirements have increased, optical systems are now also being integrated on silicon-based integrated circuits.

Thus, instead of or in addition to using silicon to facilitate the flow of electricity, silicon is used to direct the flow of light. While the speed of electricity and the speed of light are the same, light is able to carry more data over a given optical path than can electricity over a given electrical path. Accordingly, there are significant advantages to using light as a data carrier. Furthermore, using silicon as the optical medium allows for application of, and tight integration with, existing silicon integrated circuit technologies. Silicon is transparent to infrared light with wavelengths above about 1.1 micrometers. For telecommunications wavelengths, silicon has a refractive index of about 3.45, whereas silicon dioxide has a refractive index of about 1.44. The tight optical confinement provided by this high index contrast allows for microscopic optical waveguides, which may have cross-sectional dimensions of only a few hundred nanometers, thus facilitating integration with current semiconductor technologies. In addition, silicon photonic devices can be made using existing semiconductor fabrication techniques used for CMOS circuits, and because silicon is already used as the substrate for most integrated circuits, it is possible to create hybrid devices in which the optical and electronic components are integrated onto a single microchip.

In practice, silicon photonics can be implemented using silicon-on-insulator (SOI) technology or bulk silicon technology. In either case, in order for the silicon photonic components, such as waveguides, to remain optically independent from the underlying silicon of the wafer on which they are fabricated, it is necessary to have an intervening dielectric material. This is usually a dielectric such as silica (silicon dioxide), which has a much lower refractive, index (about 1.44) than silicon in the wavelength region of interest. Silica is also used on the top and sides of a silicon waveguide core, thus forming a cladding around the entire waveguide core. This results in total internal reflection of light at the silicon core-silica cladding interface and thus transmitted light remains in the silicon waveguide core.

Figure 1:
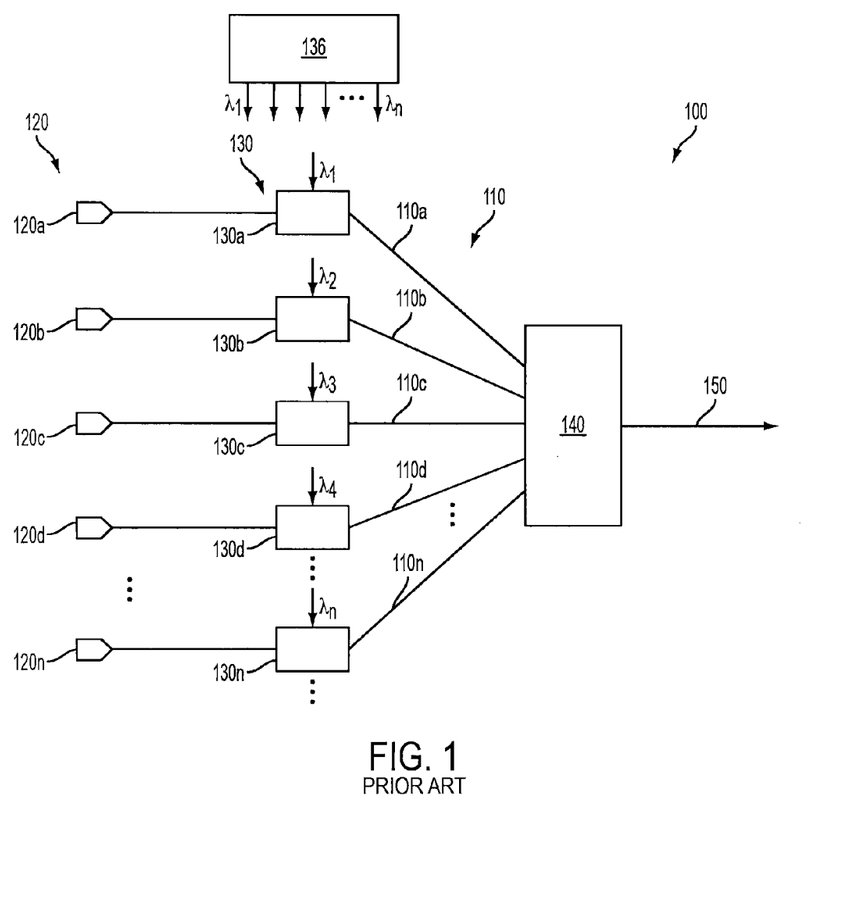
FIG. 1 shows an example of a conventional a wave division multiplex transmission system.

One communications technique which can communicate large amounts of data over a waveguide optical link is known as wave division multiplexing (WDM). A typical example of data propagation in a WDM system is illustrated in FIG. 1. As shown, an optical transmission system 100 includes, for example, a plurality of silicon waveguides 110a . . . 110n, collectively shown as waveguides 110, each carrying data of an optical communications channel. The system 100 includes multiple data input channels 120a . . . 120n, collectively shown as 120, where each data input channel 120a . . . 120n transmits data in the form of pulses of light or as electrical signals. In order to simultaneously transmit the data carried on the multiple data input channels 120a . . . 120n, the data in each data input channel 120a . . . 120n is modulated onto a respective optical carrier having a wavelength $\lambda_1 \ldots \lambda_n$ by a respective resonant optical modulator 130a . . . 130n. The outputs of the modulators 130a . . . 130n form respective optical communicating channels. The resonant optical modulators 130a . . . 130n are collectively shown as 130. The optical carriers at wavelengths $\lambda_1 \ldots \lambda_n$ can be supplied to each resonant optical modulator 130a . . . 130n by a highly accurate temperature controlled laser source 136. The modulated light output from each resonant optical modulator 130a . . . 130n is provided to a respective waveguide 110a . . . 110n and the outputs from the waveguides 110 are then multiplexed into a single optical transmission channel waveguide 150 by an optical multiplexer 140. The multiplexed light is then transmitted along the waveguide 150 to an endpoint (not shown) where the data modulated light is demultiplexed and demodulated before being used by an endpoint device.

The resonant optical modulators 130a . . . 130n, which may be ring modulators, are designed to resonate at their respective carrier wavelengths $\lambda_1 \ldots \lambda_n$. The resonant optical modulators 130a . . . 130n have resonant cavities and are constructed of materials with refractive indices, both of which are affected by temperature changes. The changes in temperature of the resonant optical modulators 130a . . . 130n cause their respective resonant frequencies to change and move away from their respective carrier wavelengths $\lambda_1 \ldots \lambda_n$. As a result, the modulation index of the modulators 130a . . . 130n drops resulting in reduced signal-to-noise ratio and the potential for data transmission errors. Therefore, there is a need for a WDM optical communications system which can adapt to temperature or other changes which might adversely affect the modulation of data signals onto an optical communication channel by a resonant optical modulator.

DETAILED DESCRIPTION OF THE INVENTION

Example embodiments described herein provide a wave division multiplex (WDM) optical communication system having a plurality of optical communications channels which can be multiplexed and demultiplexed. The WDM optical communications system can be partially or entirely integrated onto a die. Each optical communication channel has at least two spaced carriers and a data modulator having at least a first and a second resonant optical modulator circuit, each associated with a respective carrier. The first resonant optical modulator circuit has a resonant frequency at its respective carrier wavelength and the second resonant modulator circuit has a resonant frequency which is offset from its respective carrier wavelength. When temperature or other changes cause the resonance of the first resonant modulator circuit to move in a direction out of resonance with its associated carrier wavelength the same temperature or other change will also cause the resonant frequency of the second modulator circuit to move in a direction towards resonance with its associated carrier wavelength. A detector which detects when the first modulator circuit is sufficiently out of resonance with its respective carrier wavelength and the second modulator circuit is in sufficient resonance with its respective carrier wavelength is used to control switching of data modulation from the first to the second modulator circuit. As a consequence, data for a given optical communication channel is switched to a different channel carrier wavelength where it is reliably modulated by the second modulator circuit.

Although the embodiments described and illustrated herein employ two modulator circuits and associated carrier wavelengths per optical communications channel, this is merely an example as more than two resonant modulator circuits, each having a respective carrier wavelength can be used for each optical communications channel. Also, although embodiments are described with reference to a temperature change causing changes in the resonant frequency of modulator circuits, the embodiments are not limited to being responsive to only temperature changes. The embodiments can also be used in any environment where there is an induced change in the resonant frequency of modulator circuits.

The switch from the first resonant optical modulator circuit and respective carrier wavelength to the second resonant optical modulator circuit and respective carrier wavelength for transmitting data on an optical communication channel on the multiplex side can be communicated through an existing optical communications channel, or a separate electrical communications channel, to a demultiplexing side of the system. The demultiplexing side of the system uses the switching information to switch to the new modulated carrier wavelength and to an associated demodulator for proper data demodulation for each optical communications channel. The switching information is transmitted to the demultiplexing side prior to switching from the first to the second resonant optical modulator circuit on the multiplexing side so the demodulators can switch in synchronism with the switching of the modulator circuits.

Figure 2:
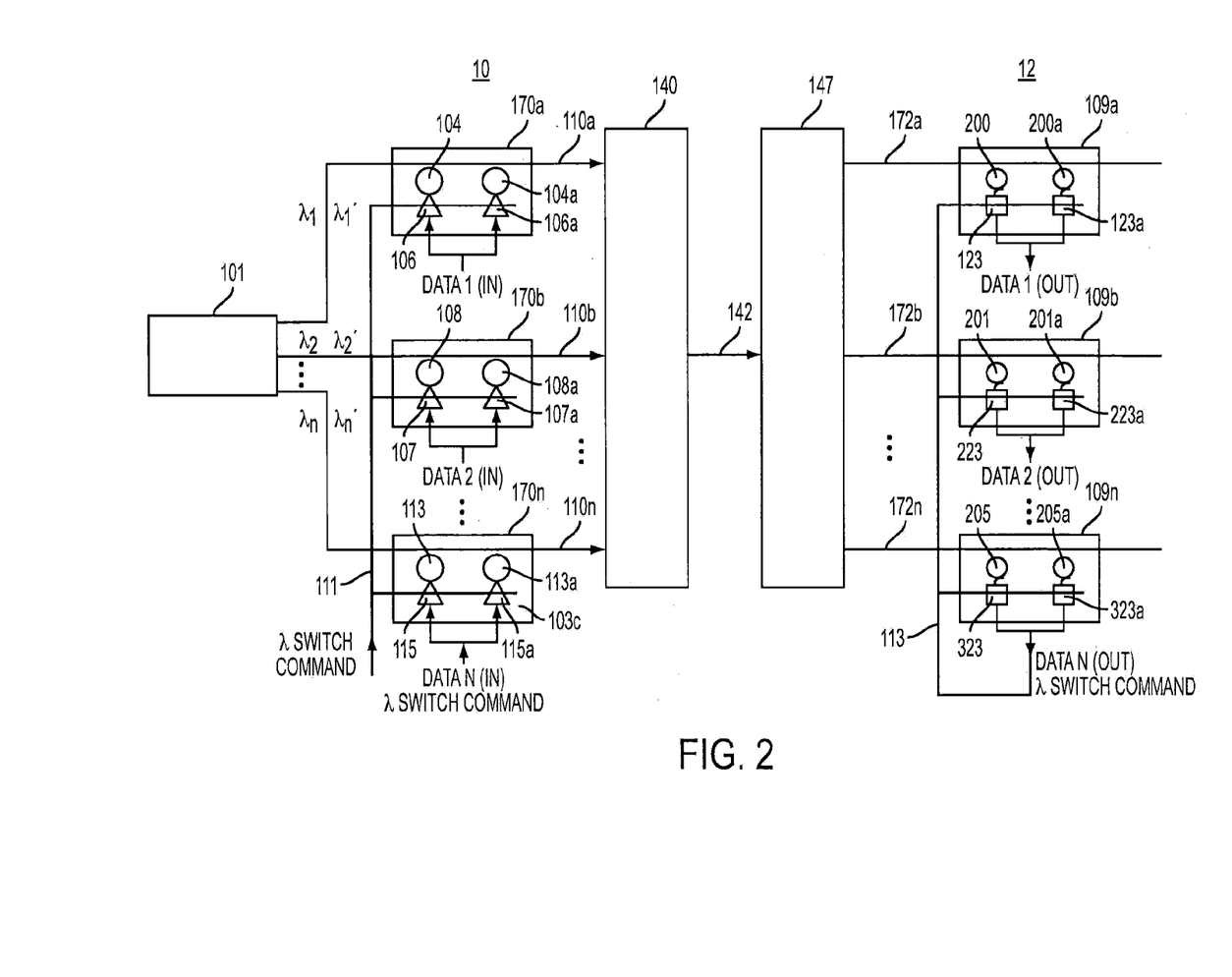
FIG. 2 shows a wave division multiplexing and demultiplexing system in accordance with an example embodiment of the invention.

FIG. 2 illustrates the multiplexing 10 and demultiplexing 12 sides of a WDM system in an example embodiment. The multiplex side 10 includes a laser source 101 providing at least two carrier wavelengths to each resonant optical modulator 170a . . . 170n. Each of the resonant optical modulators 170a . . . 170n contain at least two distinct first and second optical modulator circuits. For resonant optical modulator 170a, these are optical modulator circuits 104, 104a; for optical modulator circuit 170b, these are optical modulator circuits 108, 108a; for resonant optical modulator 170n, these are optical modulator circuits 113, 113a. Each resonant optical modulator 170a . . . 170n output is a respective optical communications channel which is supplied to respective waveguides 110a . . . 110n. Each optical modulator 170a . . . 170n also receives respective data input as DATA1, DATA2 . . . DATAN which can be supplied to each of the first and second optical modulator circuits within a given modulator 170a . . . 170n. The outputs of the resonant optical modulators 170a . . . 170n are supplied via respective waveguides 110a . . . 110n to an optical multiplexer 140 which multiplexes the optical communication channels on waveguides 110 onto a waveguide 142 which sends the multiplexed optical communications channels to the demultiplexing side 12 of the system.

The demultiplexing side 12 includes optical demultiplexer 147 for demultiplexing the signals on waveguide 142, a plurality of waveguides 172a . . . 172n for the respective ones of demultiplexed optical communications channels, and a plurality of demodulation circuits 109a . . . 109n for respectively demodulating the received carrier on waveguides 172a . . . 172n to supply demodulated data as DATA1 (OUT) . . . DATAN (OUT).

Figure 3A:
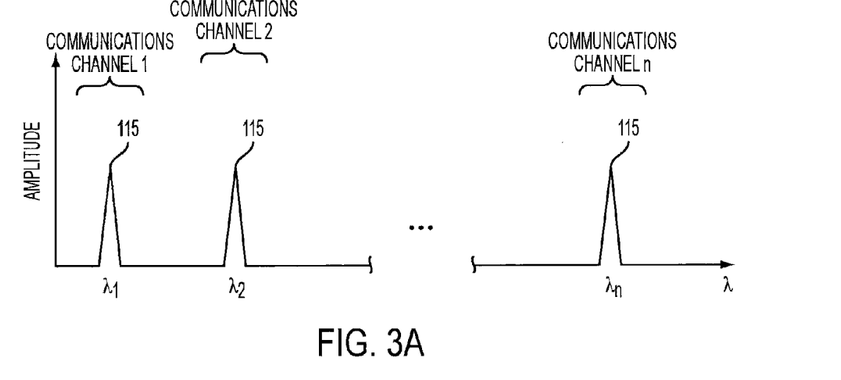
FIG. 3A, shows an example of a conventional WDM optical communications system channel structure.
Figure 3B:
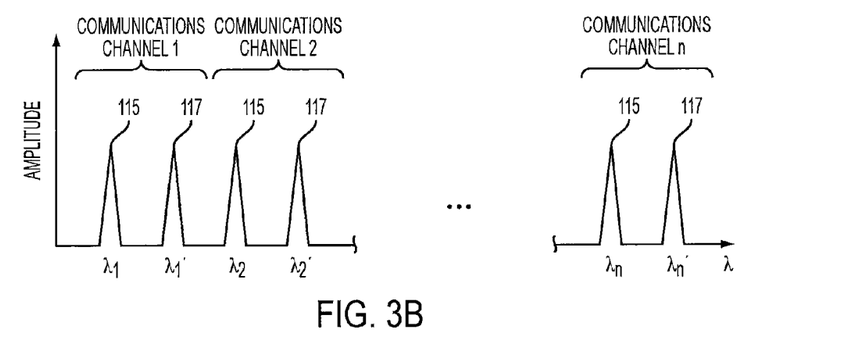
FIG. 3B shows an example of a WDM optical communications system channel structure which may be used with the FIG. 2 embodiment.

Before describing the operation of the FIG. 2 system in greater detail reference is made to FIGS. 3A and 3B. FIG. 3A shows an example of an optical communications channel carrier spacing in a conventional WDM system. Each of the optical communications channels are illustrated as having respective spaced wavelengths 115 of $\lambda_1, \lambda_2, \ldots \lambda_n$ which can be modulated. In the embodiment illustrated in FIG. 2 at least one additional carrier 117 is added for each optical communications channel. The additional carriers are offset from respective FIG. 3A carrier wavelengths and are shown in FIG. 3B as wavelengths $\lambda_1', \lambda_2' \ldots \lambda_n'$. Thus, at least two carriers 115, 117 are available for data modulation for each optical communications channel on the multiplexing side 10 of the FIG. 2 system.

Referring back to FIG. 2 laser source 101 is temperature controlled to provide stable carrier wavelengths and may be formed of one or more temperature controlled lasers. Laser source 101 provides the at least two carrier wavelengths shown in FIG. 3B, for each optical communications channel. For example, the optical communications channel which is associated with modulator 170a has two carriers at respective wavelengths $\lambda_1$ and $\lambda_1'$ provided to modulator 170a. The same is true for each of the other optical communications channels associated with modulators 170b . . . 170n. It should be noted that although laser source 101 is shown as having a respective waveguide connection to each of the modulators 170a . . . 170n there may in practice be a single output from laser source 101 at all carrier wavelengths which is fed to all the modulators 170a . . . 170n. A modulator 170a . . . 170n will only resonant with and modulate data onto a respective one of the at least two carrier wavelengths of its associated optical communications channel.

As noted, each modulator 170a . . . 170n includes at least a first and second ring resonator optical modulation circuit, which are designed to resonate with only one of the two carriers provided for its associated optical communications channel. Thus, modulator 170a contains optical modulation circuits 104 and 104a each designed to be resonant with one of the two supplied carriers, e.g. $\lambda_1$ (for 104) and (for 104a). Likewise modulator 170b contains resonant circuits 108, 108a associated with carriers $\lambda_2$ (for 108) and $\lambda_2'$ (for 108a), and modulator 170n contains resonant circuits 113, 113a respectively associated with carriers $\lambda_n$ (for 113) and (for 113a). The resonant frequencies of the two modulator circuits in each of modulators 170a . . . 170n are such that when a first of the two resonant circuits, e.g. 104, is resonating with its respective carrier at a given temperature, e.g., $\lambda_1$ the other resonant circuit 104a is not resonant with its respective carrier $\lambda_1'$ because the resonant frequency of the second modulator circuit 104a is shifted away from its associated carrier $\lambda_1'$.

The relationship of the carriers to the modulation circuits in each of modulator 170a . . . 170n and the effect of temperature changes on each is now explained with reference to FIG. 4, using the modulator circuits 104 and 104a of modulator 170a as an example. The FIG. 4 diagram shows an arrangement which exists at ambient temperature, denoted as T=To. In this case, ring modulator circuit 104 has a resonant frequency $\lambda_{1a}$ which aligns well with the channel carrier wavelength $\lambda_1$. Accordingly, ring modulator circuit 104 can reliably transmit data denoted as DATA1 onto the carrier wavelength $\lambda_1$. However, the resonant frequency $\lambda_2$a of the ring modulator 104a is not aligned with the wavelength of its associated carrier $\lambda_1'$ and therefore cannot reliably modulate the data DATA1 onto carrier $\lambda_1'$. Moreover, each of the ring modulators 104, 104a has a respective driver circuit 106, 106a (FIG. 2) which is selectively enabled by a switch command on control line 111, such that only one ring modulator 104, 104a is active at a time. At ambient temperature T=To, only ring modulator circuit 104 is active while modulator 104a is inactive.

When the temperature of the ring modulator circuits 104, 104a increase to T=To+ΔT, the resonant frequency of the ring modulator 104 shifts to a resonant frequency at a wavelength $\lambda_{1b}$. At this resonant frequency modulator 104 can still resonate with its respective carrier $\lambda_1$, but begins to lose its ability to resonate with the carrier $\lambda_1$. However, this same temperature change also shifts the resonant frequency $\lambda_{2a}$ of ring modulator 104a to the point where it aligns with and can now resonate with its respective carrier at 4. So at a temperature of T=To+ΔT both modulators 104 and 104a are capable of modulating their respective carriers $\lambda_1$ and $\lambda_1'$ with data.

If the temperature of modulator circuits 104 and 104a further increases to T=To+2ΔT, the first ring modulator circuit 104 loses its ability to reliably modulate data on its respective carrier $\lambda_1$ while the second ring modulator 104a is still able to resonate with and reliably modulate data onto its carrier $\lambda_1'$.

Figure 4:
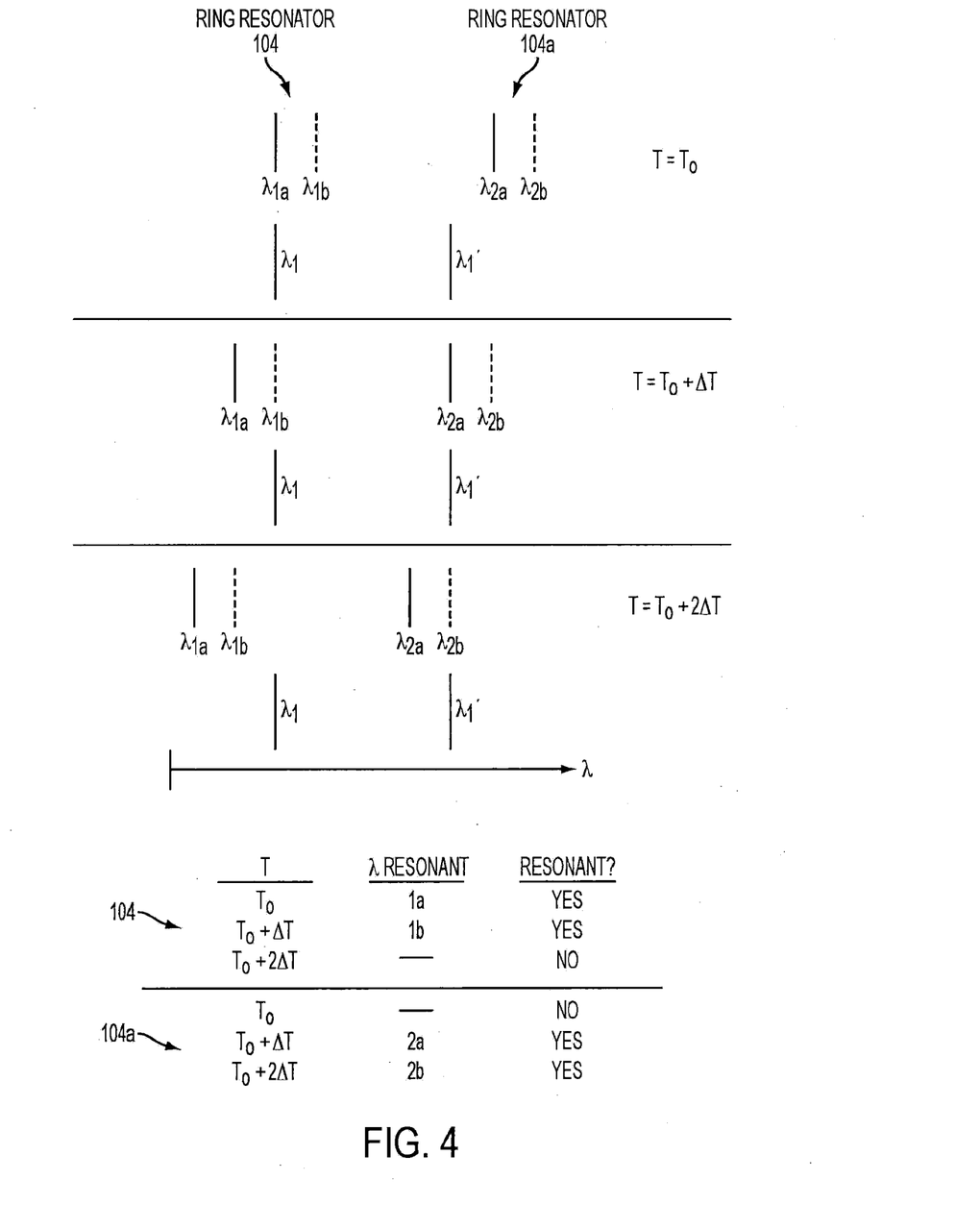
FIG. 4 illustrates one example of how a temperature change affects modulators of the FIG. 2 embodiment.

The bottom chart on FIG. 4 summarizes the operational states of ring modulators 104, 104a with respect to their ability to resonate with and modulate data on their respective carriers $\lambda_1$ and $\lambda_1'$ under the various temperature conditions. At a predetermined temperature between T=To, and T=To+2ΔT, the ring modulator 104 will be turned off and ring modulator 104a turned on so that only the latter now modulates incoming data (DATA1) onto its respective carrier $\lambda_1'$.

The switch point is a predetermined temperature where a first 104 of the two modulator circuits 104, 104a is instructed to stop modulating its respective carrier $\lambda_1$ with data and the second modulator circuit 104a is instructed to start modulating its respective carrier $\lambda_1'$ with data. This predetermined temperature switch point may be applied globally such that when the switch point temperature is detected all of the ring modulators 170a . . . 170n each will simultaneously shift from their first to their second modulator circuit. Since modulators 170a . . . 170n can be provided on a common integrated circuit die, a die temperature detector can be commonly used to determine a switch point for all modulators 170a . . . 170n. The switch command is commonly applied to all modulators 170a . . . 170n by a control line 111.

Figure 5:
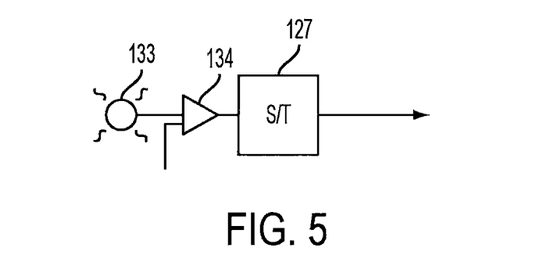
FIG. 5 illustrates an example of a temperature detector which detects changes in resonance frequency and which can be used with the FIG. 2 embodiment.

FIG. 5 illustrates a temperature detector circuit which can be used to determine when the switch point is reached and issue a corresponding switch command on control line 111 (FIG. 2) to modulators 170a . . . 170n. It includes a temperature sensor 133, such as a thermistor, which has an output connected to one input of a comparator 134. Another input to comparator 134 provides a threshold reference value which must be exceeded for comparator 134 to switch the value of an output signal. This reference value may be selected to correspond to the predetermined temperature which must be reached for the switch command to be issued. FIG. 5 also shows a hysteresis circuit 127 in the form of a Schmitt Trigger which provides the switch command signal on control line 111 to control a shift from the first ring modulator circuit to the second for all of the modulators 170a . . . 170n.

Referring again to FIG. 2, each of the ring modulator circuits within a modulator 170a . . . 170n includes an associated driver circuit 106, 106a; 107, 107a; 115, 115a, for driving the first and second modulator circuit of each modulator 170a . . . 170n with respective input data, e.g. DATA1, . . . DATAN. The driver circuits respond to the switch command signal from the FIG. 5 circuit on control line 111 to control the switch from the first modulator circuit to the second for the modulators 170a . . . 170n. For example, the driver circuits 106, 106a control the switch from first modulator circuit 104 to the second modulator circuit 104a, for the modulator 170a. The driver circuits 106, 106a have an enable/disable input line which receives the switch command from control line 111. The driver circuits, e.g. 106, 106a, can be electrical circuits receiving electrical data input or optical circuits receiving optical data input. For a system using two internal modulation circuits for each of modulators 170a . . . 170n, a logic value of "1" or "0" can be supplied by Schmitt Trigger 127 on control line 111 as the switch command.

The switch command also needs to be communicated to the demodulation circuits on the demultiplexing side 12 of the FIG. 2 system so that demodulators which are demodulating a particular carrier, e.g. $\lambda_1, \lambda_1'$ for an optical communications channel know which channel carrier to demodulate. The switch command can be sent on a particular optical data channel on the multiplexing side 10 to the demultiplexing side 12. For example, the FIG. 2 embodiment shows the modulator 170n being used for this purpose as the wavelength switch command can be part of the input DATAN, although any optical data channel can be used. Alternatively, a separate electrical channel can be used to transmit the switch command from the multiplexing side 10 to the demultiplexing side 12. The switch command is sent before an actual switch from the first to the second modulator circuit within the modulators 170a . . . 170n occurs on the multiplexing side 10 so the demodulators know when to switch and can switch in synchronism with the modulators 170a . . . 170n.

Figure 6A:
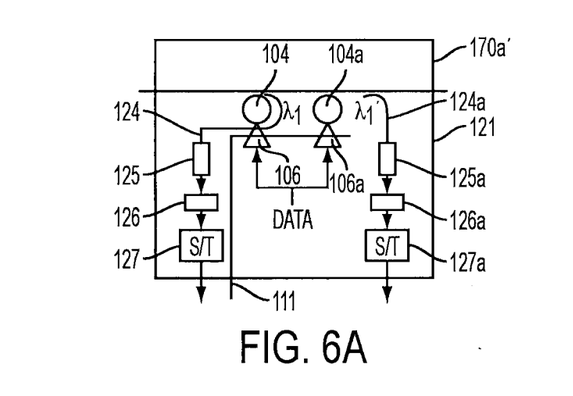
FIG. 6A illustrates an example of another detector which detects changes in resonance frequency of a modulator and which can be used with the FIG. 2 embodiment.
Figure 6B:
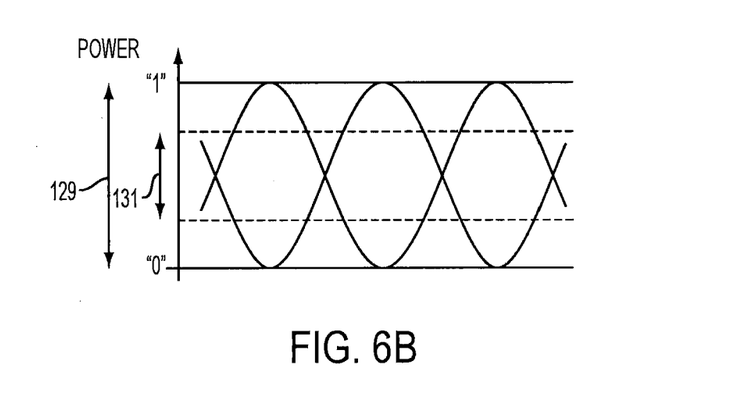
FIG. 6B illustrates an eye diagram illustrating operation of the FIG. 6A detector.

FIGS. 6A and 6B show another arrangement for providing a switch command signal on control line 111. FIG. 6A shows an alternative modulator 170a' having respective modulator circuits 104, 104a and associated driver circuits 106, 106a. A light tap 124, 124a can be provided in association with the output of a respective modulator circuit 104, 104a to receive a small portion of modulated light representing the light output by the respective modulator circuits 104, 104a. The light taps 124, 124a connect with respective photo detectors 125, 125a. The outputs of the photo detectors 125, 125a are fed to respective comparators 126, 126a which have signal thresholds representing a particular level of signal power delivered by the photo detector 125, 125a. When the detected power for modulator circuit 104 falls below a threshold value set by the comparator 126 this indicates that resonance of resonance circuit 104 with its respective carrier $\lambda_1$ is being lost. FIG. 6B shows an eye diagram representing the modulation index of a modulation circuit. When the resonant circuit 104 is in complete resonance with its associated carrier $\lambda_1$ a high modulation index represented by power value 129 is evident. However, when the resonant circuit 104 starts to become out of resonance with its associated carrier $\lambda_1$ power is reduced and the modulation index drops according to the amount of shift in the resonance frequency of the modulator circuit 104 relative to the carrier wavelength $\lambda_1$. This lowered modulation index is represented by the power value 131 in FIG. 6B. Comparator 125 can be used to determine when the lowered modulation index is achieved, for example, a modulation index lowered by 8 dB, and provide a switch signal indicating that a switch should occur from the first modulation circuit 104 to the second 104a. A hysteresis circuit 127, such as a Schmitt Trigger, provides the switch control signal.

FIG. 6A also shows a separate detector, which includes tap 124a, photo detector 125a, comparator 126a, a Schmitt Trigger and hysteresis circuit 127a, for detecting loss of resonance of the second modulator circuit 104a' with its respective carrier $\lambda_1'$. This is used to determine when the temperature of the modulators 170a . . . 170n has lowered to the point where a switch should occur from the second modulator circuit 104a modulating its carrier $\lambda_1'$ back to the first modulator circuit 104 for modulating its carrier $\lambda_1$. The FIG. 5 temperature detector output can also be used to switch back from the second 104a to the first 104 modulator circuit when the detected temperature falls below the switch threshold set by comparator 134.

Referring back to FIG. 2, the carriers of optical communications channels are demultiplexed by demultiplexer 147 and the demultiplexed optical communications channels are provided on respective waveguides 172a . . . 172n. Each of the demultiplexed optical communications channels can have data modulated on one of at least two carriers of the communications channel, e.g. $\lambda_1$, or $\lambda_1'$ for the optical communications channel associated with modulator 170a on the multiplex side 10. Each optical communications channel on respective waveguides 172a . . . 172n has an associated demodulator 109a . . . 109n, each of which contains at least a first and second wide band resonant ring demodulator circuit. For example, demodulator 109a includes first and second resonant ring demodulator circuits 200, 200a for respectively demodulating the carriers $\lambda_1$, $\lambda_1'$. Likewise demodulators 109b and 109n have demodulator circuits 201, 201a and 205, 205a respectively. Each of the demodulator circuits, 200, 200a; 201, 201a; 205, 205a are wide band resonant ring demodulator circuits which are capable of resonating with and demodulating a respective carrier over wide ranges of temperature changes, which otherwise would adversely affect a modulating circuit, e.g. 104, 104a.

The switch command generated on the multiplexer side 10 and sent to the demultiplexer side 12 tells the demodulators 109a . . . 109n which internal demodulation circuit to use corresponding to the carrier wavelength which is being modulated for the corresponding optical communications channel. Before a shift from a first demodulator circuit, e.g. 200 to second, e.g. 200a, occurs within a demodulator 109a . . . 109n the switch command is received, demodulated off the communications channel communicating it, e.g. demodulator 109n, and sent on control line 113 to all of the demodulators 109a . . . 109n instructing a switch from the first internal demodulator circuit, e.g. 200 to the second, e.g. 200a. Each demodulator circuit, e.g. 200, 200a has an associated light tap for receiving demodulated data and passing it to a respective photo detector e.g. 123, 123a for demodulator 109a, 223, 223a for demodulator 109b, and 323, 323a for demodulator 109n. The respective photo detectors 123, 123a, 223, 223a, 323, 323a can be turned on or off by the received switch command on control line 113 such that only one photo detector of each pair is on at a time.

For a system using two modulator circuits per modulator 170a . . . 170n, one logic state of a switch command e.g. "1" can be used to turn on a first photo detector, e.g. 123 while turning off a second photo detector e.g. 123a. Likewise, the other logic state, e.g. "0", turns off the first photo detector 123 and turns on the second photo detector 123a. Each of the demodulators 109a . . . 109n has the output of the photo detector e.g. 123, 123a combined to provide a data output signal, e.g. DATA 1 (Out) for demodulator 109a. In this way, one of the demodulator circuits e.g. 200, 200a, which demodulates its associated channel carrier $\lambda_1$, $\lambda_1'$, is selected for providing a data output signal e.g. DATA 1 (Out) for its associated optical communications channel.

Figure 7A:
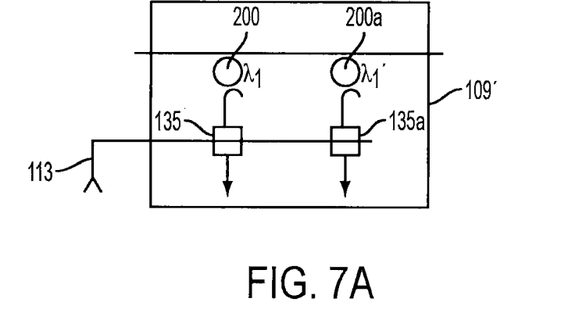
FIGS. 7A, 7B and 7C show respective example embodiments of alternative demodulators which may be used in the FIG. 2 embodiment.

FIG. 7A illustrates a modified demodulator 109' which can be used in the FIG. 2 system in place of the demodulators 109a . . . 109n. Here, instead of combining the outputs of photo detectors 135 and 135a, the photo detector outputs remain separate. Here again, the switch command on line 113 is used to select one or the other of photo detectors 135, 135a for output.

Figure 7B:
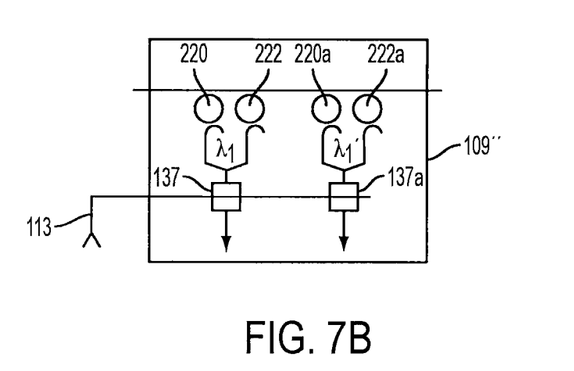

FIG. 7B illustrates another demodulator 109" which can be used in the FIG. 2 system in place of the demodulators 109a . . . 109n. Here each demodulator circuit within demodulator 109" is formed by pair of narrow band ring demodulators 220, 222 and 220a, 222a. The first pair of ring demodulators, e.g. 220, 222 have resonant frequencies slightly offset from one another, with one being centered on the first carrier of a optical communications channel and the other offset from that. With the FIG. 7B arrangement if a temperature change is enough to shift resonance of the narrow band ring demodulator 220 out of resonance with carrier $\lambda_1$, but the temperature change is not yet sufficient to cause the modulators 170a . . . 170n to switch to the carrier $\lambda_1$, demodulator circuit 222 moves into closer resonance with the first carrier $\lambda_1$. In this case, the output of both ring demodulators 220 and 222 are optically combined and fed to a single photo detector 137 which provides a data output signal, e.g. DATA1(OUT).

A second demodulation circuit is also included within demodulator 109" and is formed by a second pair of narrow band ring demodulators 220a, 222a. They are arranged such that one of the ring demodulators 220a has a resonant frequency which is centered on the second carrier wavelength of a communication channel, e.g. $\lambda_1'$ for the optical communications channel associated with modulator 170a and with the other ring demodulator 220b slightly offset from that. Thus if the optical communications channel is using the second carrier $\lambda_1'$, and there is temperature change which moves resonance of demodulator circuit 220a away from the carrier $\lambda_1'$, the demodulator circuit 222a moves into resonance with carrier $\lambda_1'$, the outputs of both ring demodulators 220a, 222a are combined and sent to a photo detector 137a. The received switch command on line 113 is used to select one of the photo detectors 137, 137a output for providing output data, e.g. DATA 1 (Out).

Figure 7C:
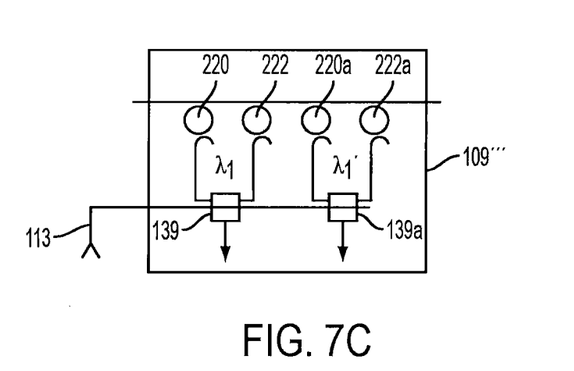

FIG. 7C shows another demodulator 109''' which may be used in the FIG. 2 system. Demodulator 109''', is similar to demodulator 109". However, unlike in demodulator 109", where the optical outputs of the paired ring demodulators 220, 222 and 220a, 222a are first optically combined and then sent to respective photodiodes 137, 137a, in demodulator 109''' the optical signals from the paired narrow band ring demodulators 220, 222 and 220a, 222a are sent directly to the respective photo detectors 137, 137a.

While various embodiments have been described and illustrated these are merely examples of how the invention may be practiced. Accordingly, the invention is not to be seen as limited by the foregoing description, but is only limited by the scope of the pending claims.

What is claimed as new and desired to be protected by Letters Patent of the United States is:

1. An optical communications system comprising
at least one optical signal source providing a plurality of spaced optical carrier wavelengths forming a plurality of optical communication channels, each optical communications channel having at least two carrier wavelengths which can be modulated with data; and
a respective optical modulator for each optical communications channel, each optical modulator comprising at least a first and second resonant modulator circuit, each for selectively modulating one of the carrier wavelengths associated with the optical communications channel with data, the first resonant modulator circuit having a resonant frequency at a first of the carrier wavelengths of the associated optical communications channel and the second resonant modulator circuit having a resonant frequency shifted from and out of resonance with a second of the carrier wavelengths of the associated optical communications channel.

2. A system as in claim 1, wherein for each optical communications channel the resonant frequency of the first and second resonant modulator circuits can shift with a temperature increase and the shift in resonant frequency with a temperature increase of the second modulation circuit is towards obtaining resonance with the second of the carrier wavelengths.

3. A system as in claim 2, further comprising a first switch circuit for switching from the first to the second modulator circuit of each optical communications channel in response to a switch command.

4. A system as in claim 3, further comprising a detector circuit for issuing the switch command when a particular temperature is detected.

5. A system as in claim 4, wherein the detector circuit detects the temperature of a die on which the optical modulators are located.

6. A system as in claim 4, wherein the detector circuit comprises a temperature sensor which provides an output to a hysteresis circuit.

7. A system as in claim 6, wherein the hysteresis circuit comprises a Schmitt Trigger.

8. A system as in claim 3, further comprising a detector circuit for issuing the switch command when a predetermined amount of shift in the resonance frequency of a first modulator circuit is detected relative to the first carrier wavelength in at least one of the optical communications.

9. A system as in claim 5, wherein the detector circuit detects a drop in a modulation index of the first modulator circuit.

10. A system as in claim 9, wherein the detector circuit further comprises a hysteresis circuit.

11. A system as in claim 10, wherein the hysteresis circuit comprises a Schmitt Trigger.

12. A system as in claim 3, further comprising an optical multiplexer for multiplexing the plurality of optical communications channels onto a waveguide.

13. A system as in claim 12, further comprising an optical demultiplexer for receiving the optical communications channels from the waveguide and demultiplexing them into respective received optical communications channels.

14. A system as in claim 13, further comprising an optical demodulator respectively associated with each demultiplexed optical communication channel, each optical demodulator comprising at least two optical demodulator circuits, a first for demodulating data signals on the first carrier wavelength associated with the respective optical communication channel and a second for demodulating optical signals on the second carrier wavelength associated with the respective optical communications channel.

15. A system as in claim 14, further comprising a second switch circuit associated with each optical demodulator for selecting one of the first and second optical demodulator circuits for providing demodulated output data.

16. A system as in claim 15, wherein the second switch circuit is responsive to a received switch command.

17. A system as in claim 16, wherein the received switch command is received over one of the demultiplexed optical communications channels.

18. A system as in claim 16, wherein the switch command is received over an electrical communications channel.

19. A system as in claim 14, wherein each optical demodulator circuit has an associated optical tap for providing an optical output signal to a respective photo detector.

20. A system as in claim 14, wherein each of the said first and second optical demodulator circuits of an optical demodulator comprises a pair of optical demodulator circuits having optical resonant frequencies which are shifted from each other.

21. A system as in claim 1, wherein for each optical communications channel the resonant frequency of the first and second resonant modulator circuits can shift such that as the resonant frequency of the first resonant modulator circuit shifts away from the first of the carrier wavelengths of the associated communications channel, the resonant frequency of the second resonant modulator circuit shifts towards the second of the carrier wavelengths of the associated optical communications channel.

22. An optical communications method comprising:
establishing a plurality of carrier wavelengths for at least one optical communication channel;
modulating data on a first one of the carrier wavelengths of the at least one optical communications channels using a first resonant modulator;
determining if the first resonant modulator is losing resonance with the first carrier wavelength and, if so, turning off the first resonant modulator and turning on a second resonant modulator which modulates data on a second one of the carrier wavelengths of the at least one optical communications channel.

23. An optical communications method as in claim 22, wherein a plurality of optical communications channels are provided, each having a first and second carrier wavelength and a first resonant modulator circuit for modulating data on the first carrier wavelength and a second resonant modulator circuit for modulating data on the second carrier wavelength, the method further comprising turning off the first resonant modulator circuit and turning on the second resonant modulator circuit of each optical communications channel at substantially the same time.

24. A method as in claim 23, wherein the first resonant modulator circuit of each associated optical communications channel has a resonant frequency at the wavelength of the first carrier wavelength of the associated optical communications channel and the second resonant modulator circuit of each associated optical communications channel has a resonant frequency displaced from the second carrier wavelength of the associated communications channel such that as the first resonant modulator moves out of resonance with the first carrier wavelength the second resonant modulator moves into resonance with the second carrier wavelength.

25. A method as in claim 24, further comprising wave division multiplexing the plurality of optical communications channels onto a multiplexed communications channel on a multiplexing side of the system.

26. A method as in claim 25, further comprising demultiplexing the plurality of optical communications channels from the multiplexed communications channel on a demultiplexing side of the system, and demodulating data off the one of the first and second carrier wavelengths of each optical communications channel which has been modulated with data.

27. A method as in claim 26, further comprising sending a signal from the multiplexing side to the demultiplexing side indicating when the first modulator is being turned off and when the second modulator is being turned on.

28. A method as in claim 27, wherein the demodulation of data is performed by a selected one of at least a first demodulator circuit associated with the first carrier wavelength of an optical communications channel and a second demodulator circuit associated with the second carrier wavelength of an optical communications channel, the selection being based on the signal from the multiplexing side.

29. A method as in claim 27, further comprising sending the signal on one of the optical channels.

30. A method as in claim 27, further comprising sending the signal on an electrical communication channel.

31. A method as in claim 22, wherein the determination is made based on sensing a temperature which affects the first and second resonant modulator circuits.

32. A method as in claim 22, wherein the determination is made based on sensing the quality of the modulation performed by the first resonant modulator.

* * * * *

UNITED STATES PATENT AND TRADEMARK OFFICE
CERTIFICATE OF CORRECTION

| | | |
|---|---|---|
| PATENT NO. | : 8,718,466 B2 | Page 1 of 1 |
| APPLICATION NO. | : 13/547139 | |
| DATED | : May 6, 2014 | |
| INVENTOR(S) | : Roy Meade et al. | |

It is certified that error appears in the above-identified patent and that said Letters Patent is hereby corrected as shown below:

In the Claims

In column 9, line 48, in Claim 9, delete "claim 5," and insert -- claim 8, --, therefor.

Signed and Sealed this
Nineteenth Day of August, 2014

Michelle K. Lee
*Deputy Director of the United States Patent and Trademark Office*